United States Patent [19]
Vogelnik

[11] 4,316,315
[45] Feb. 23, 1982

[54] PLIERS

[76] Inventor: Josko Vogelnik, 706 Monarch Mansions, 36 Twist St., Johannesburg, Transvaal, South Africa

[21] Appl. No.: 116,628

[22] Filed: Jan. 29, 1980

[51] Int. Cl.$^3$ ........................................ B23P 15/10
[52] U.S. Cl. ........................................ 29/229; 81/305; 7/134
[58] Field of Search .................... 29/229; 81/304, 305, 81/306, 311, 312; 7/125, 132, 133, 134; 30/261

[56] References Cited

U.S. PATENT DOCUMENTS

| | | | |
|---|---|---|---|
| 2,651,227 | 9/1953 | Kennington | 81/305 |
| 3,564,694 | 2/1971 | Millheisher | 29/229 |
| 3,575,070 | 4/1971 | Nichols | 30/261 |

FOREIGN PATENT DOCUMENTS

| | | | |
|---|---|---|---|
| 85248 | 1/1895 | Fed. Rep. of Germany | 7/125 |
| 125972 | 9/1919 | United Kingdom | 81/305 |

*Primary Examiner*—James L. Jones, Jr.
*Attorney, Agent, or Firm*—Fleit & Jacobson

[57] ABSTRACT

This invention relates to a pair of double acting circlip pliers which consists of two jaw members which are pivotally connected intermediate their ends so that the free ends of the jaw members define first and second pairs of jaws on opposite sides of the pivot. The pliers further includes a pair of handle members which are freely rotatable about the pivot and adapted by means of suitably positioned formations to engage the first pair of jaws to operate the second pair when the handles are rotated towards each other in one direction and to engage the second pair to operate the first when the handles are rotated towards each other in the opposite direction.

10 Claims, 5 Drawing Figures

FIG. 1
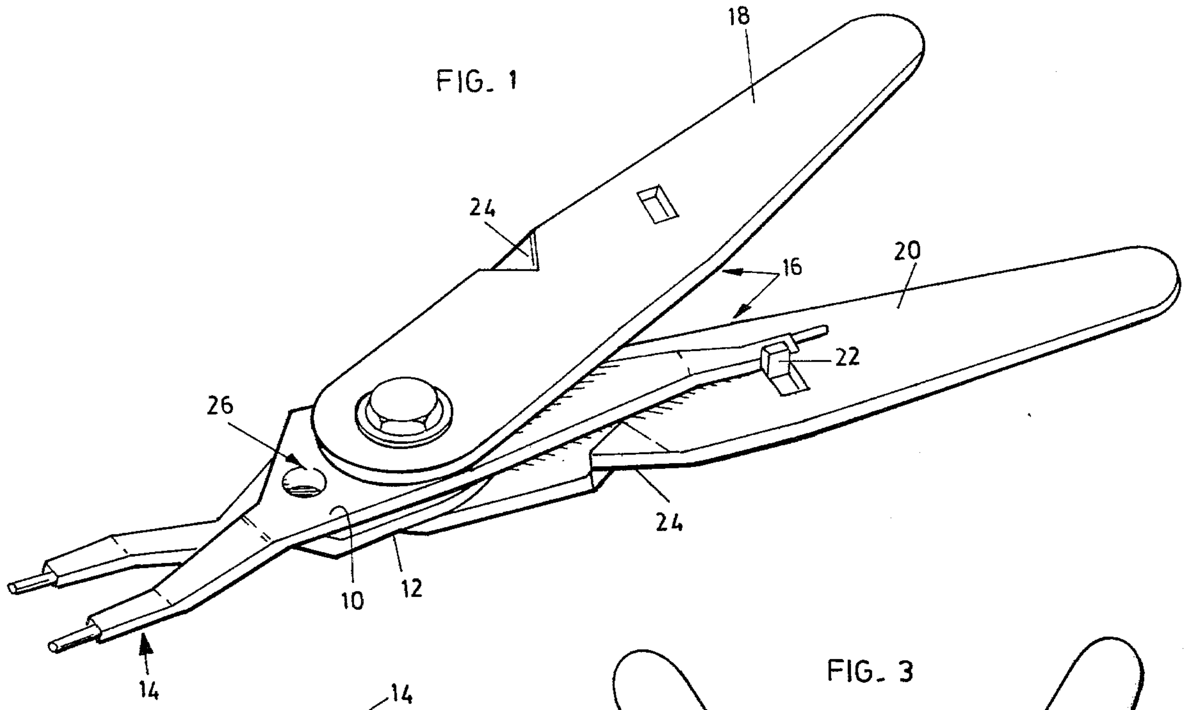
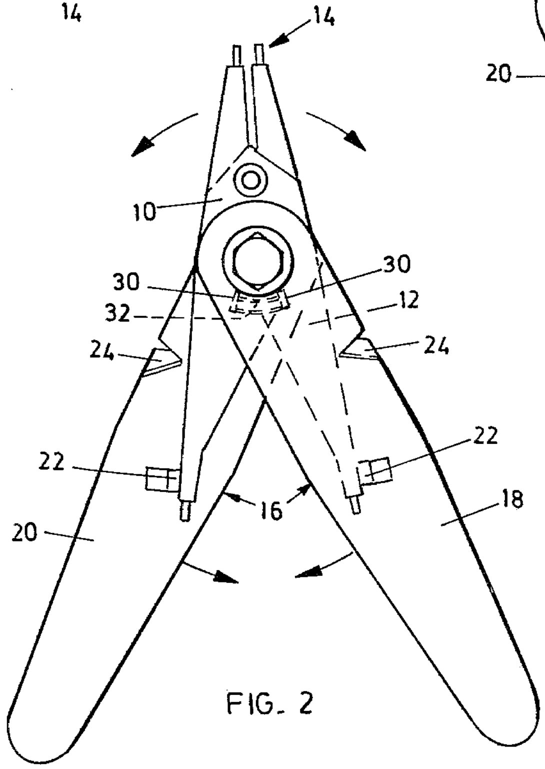
FIG. 2
FIG. 3
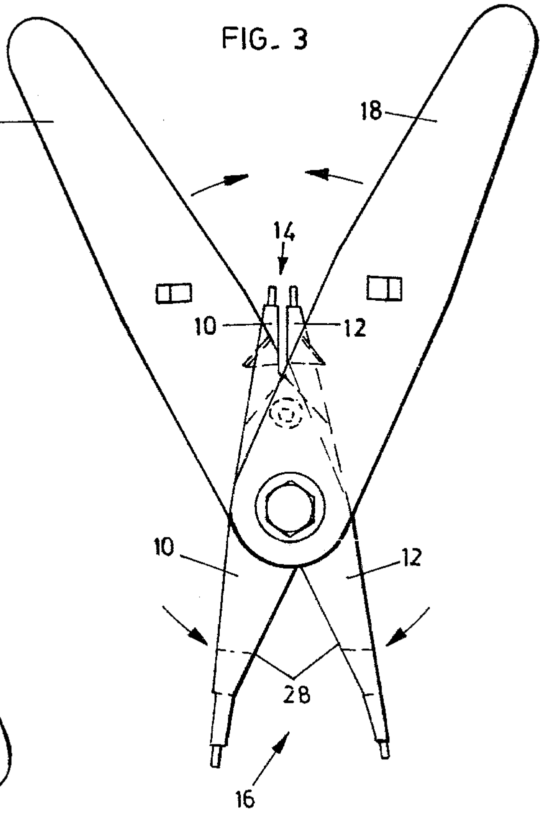

PLIERS

FIELD OF THE INVENTION

This invention relates to pliers and particularly circlip pliers.

BACKGROUND TO THE INVENTION

There are basically two types of circlip. The first type is adapted to encircle and be located in a groove in a shaft, and the second is adapted to be located in a groove in the inner wall of a housing.. To release circlips of the first type from a shaft it is necessary to employ a circlip plier adapted to move the free ends of the clip apart, and to release the second type it is necessary to employ a second type of plier adapted to move the ends of the clip towards each other.

OBJECT OF THE INVENTION

It is the object of this invention to provide a single plier which may be used to manipulate both types of circlip.

SUMMARY OF THE INVENTION

According to the invention there is provided a pair of double acting pliers which include a pair of jaw members which are connected by a pivot member intermediate their ends with the free ends of the members defining first and second pairs of jaws on opposite sides of the pivot member, a pair of handle members which are anchored to for rotation about the pivot member and formations on the handle members which when the handles are rotated towards each other in a first direction engage the jaw members adjacent the first pair of jaws to move the second pair of jaws towards each other and which when the handle members are rotated towards each other in the opposite direction engage the jaw members adjacent the second pair of jaws to move the first pair of jaws away from each other.

Preferably both the jaw and handle members are made from flat sheet metal with the two types of components each being identical in shape. The formations on the handle members may consist of lugs which are pressed from the material of the members.

Further according to the invention the pliers include means engaged with the jaw members for biasing the first pair of jaws towards each other.

In a preferred form of the invention the pliers are circlip pliers and the ends of the jaw members carry pins for engaging the eyes of circlips.

BRIEF DESCRIPTION OF THE DRAWINGS

An embodiment of the invention is now described by way of example with reference to the drawings in which:

FIG. 1 is a perspective view from above of a pliers according to the invention,

FIG. 2 is a plan view of the plier illustrating the operation of one pair of jaws, FIG. 3 is a view similar to that of FIG. 2 illustrating the operation of the other pair of jaws.

DETAILED DESCRIPTION OF THE PREFERRED EMBODIMENT

Figure 4:
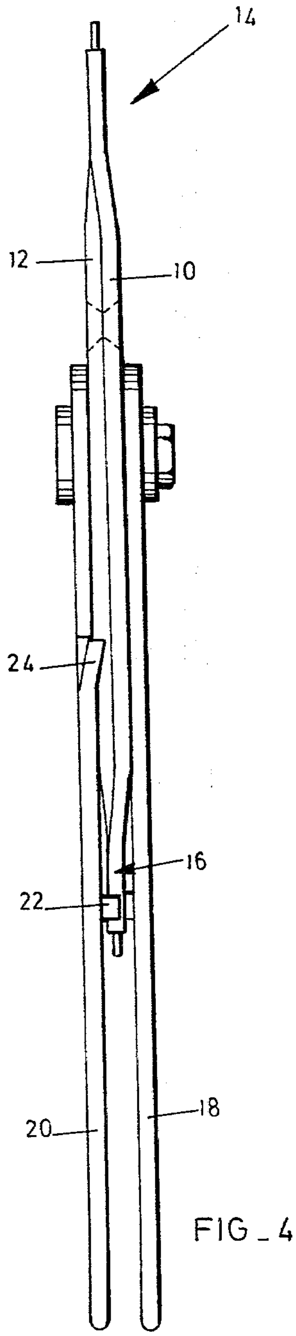
FIG. 4 is an enlarged side elevation of the plier of FIG. 2 when viewed from the left.

The circlip pliers of the invention shown in the drawings includes jaw members 10 and 12 which are pivotally connected to provide two pairs of opposed jaws indicated generally at 14 and 16, and handles 18 and 20.

The members 10 and 12 are shaped as illustrated in the drawings with circlip engaging pins located in the tips of the jaws. The jaw members are bent, as illustrated in FIGS. 1, 4 and 5, so that the tips of the jaw members of each pair of jaws will rotate about the pivot in a common plane.

The jaws 14 are biased toward each other by a spring, not shown, which acts around the pivot. In a variant, illustrated in FIG. 2 only, the jaw members 10,12 are each formed with an arcuate slot adjacent the pivot with a portion of the pressed out metal at one end of each slot bent to form a tab 30 that protrudes into the slot of the other member with the tabs being opposite each other in the cavity provided by the slots. A spring 32 is located in the cavity defined between the tabs. Preferably the spring is a block of elastomeric material. The entire arrangement of slots tabs and spring, as is illustrated in FIG. 2 is permanently located below and protected by the handles 18 and 20.

The handles 18 and 20 are freely rotatable about the pivot connecting the jaw members 10,12 and each includes a formation 22 and a formation 24 which are cut and bent from the general plane of each handle with both of the formations on one handle directed towards the other handle. The jaws 14 are shorter than the jaws 16 and, importantly, as seen in FIGS. 4 and 5, the formations 22 are radially further from the pivot than the tips of the jaws 14.

Figure 5:
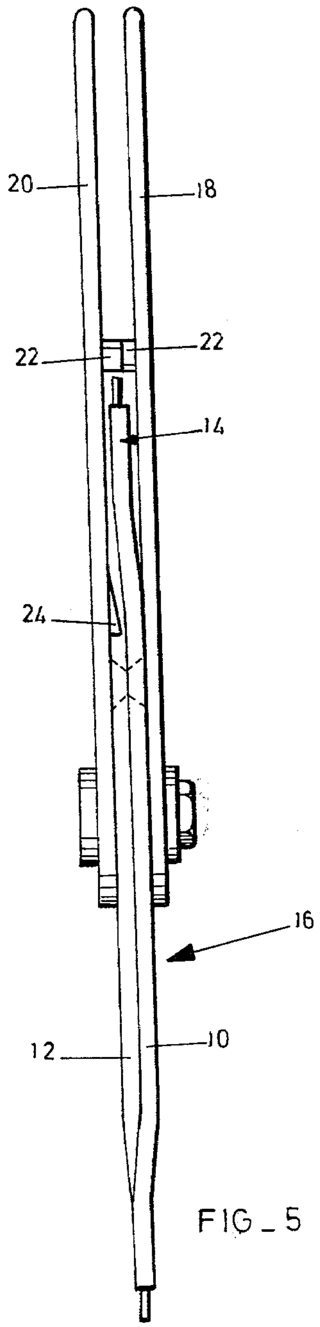
FIG. 5 is a similar view of the FIG. 3 plier.

The formations 22 are positioned on the handles to engage the edges of the jaws 16 near their tips, as is seen in FIGS. 2 and 4, with the formation 22 on the handle 18 engaging the jaw member 10 and the formation 22 on the handle 20 engaging the jaw member 12. Further movement of the handles towards each other from the positions illustrated in FIGS. 1 and 2 will cause the jaws 16 to move towards each other and the jaws 14 to move apart against the bias of the spring. The jaws 14 are used to manipulate circlips of the first type mentioned above.

To operate the jaws 16 to handles 18 and 20 are rotated from the FIG. 2 position to slightly beyond the FIG. 3 position until the formation 24 on the handle 18 passes across the jaw member 12 to abut the inner edge of the jaw member 10. The formation 24 on the handle 26 likewise passes under jaw member 10 to abut the jaw member 12, as seen in FIG. 5. Continued movement of the handles towards each other from the position illustrated in FIG. 3 will cause the formations 22 to move the jaws 14 apart against the bias of the spring so causing the jaws 16 to move towards each other to enable the plier now to manipulate circlips of the second type mentioned above. During movement of the handles towards each other in this mode of operation, the formations 22, as can seen from FIG. 5, are clear of the tips of the jaws 14.

The jaw members in the region of the jaws 14 are holed at 26 to provide a wire or pin shear and inner edges 28 of the members in the region of the jaws 16 may be hardened to provide a cutter or shear.

An important feature of the invention is that the jaw members 10 and 12 are identical and so are the handles 18 and 20. Another feature is that the levers and handles can each be simply made in a combined cutting and pressing operation.

I claim:

1. Double acting pliers including a pair of jaw members which are connected by a pivot member intermediate their ends with the free ends of the members defining first and second pairs of jaws on opposite sides of the pivot member, a pair of handle members which are anchored for rotation about the pivot member and formations on the handle members which when the handles are rotated towards each other in a first direction engage the jaw members adjacent the first pair of jaws to move the second pair of jaws towards each other and which when the handle members are rotated towards each other in the opposite direction engage the jaw members adjacent the second pair of jaws to move the first pair of jaws away from each other, the two pairs of jaws being at different distances from the pivot; and the formations on the handles comprising a first pair which, in the first direction of rotation of the handles, are located to engage the inner faces of the jaw members to force the second pair of jaws together, and a second pair, spaced radially beyond the first pair of jaws, which, in the second direction of rotation of the handles, are located to engage the outer faces of the jaw members to force the first pair of jaws apart.

2. Pliers as claimed in claim 1 in which the jaw members are identical in shape and are arranged so that one is reversed with respect to the other.

3. Pliers as claimed in claim 2 in which the handle members are identical in shape and are arranged so that one is reversed with respect to the other.

4. Pliers as claimed in claim 1 in which the pliers are circlip pliers and the ends of the jaw members carry pins for engaging the eyes of circlips.

5. Pliers as claimed in claim 1 including means biasing the first pair of jaws towards each other.

6. Pliers as claimed in claim 5 in which the biasing means is a spring which is located in a recess in each jaw member with the recesses between them defining a cavity in which the spring is located.

7. Pliers as claimed in claim 6 in which the spring is a resiliently deformable elastomeric element.

8. Pliers as claimed in claim 1 in which each jaw member carries a recess on opposite sides of the pivot member with each recess corresponding in position with a recess on the other jaw member to define between the recesses cavities on opposite sides of the pivot member in each of which a spring is located to bias the jaw members against force on the handle members in use.

9. Pliers as claimed in claim 4 in which the jaw members are made from flat sheet metal with at least the metal adjacent the second pair of jaws being hardened so that these portions of the jaw members may serve as cutters or shears.

10. Pliers as claimed in claim 1 in which the handle members are made from flat sheet metal and the formations are two lugs which are pressed from the material of each handle member with one lug on each handle member being positioned to engage a jaw member adjacent the first pair of jaws and the other a jaw member adjacent the second pair of jaws.

* * * * *